June 26, 1923.
M. LOUGHEAD
BRAKING APPARATUS
Filed Dec. 17, 1920
1,460,163
3 Sheets-Sheet 3
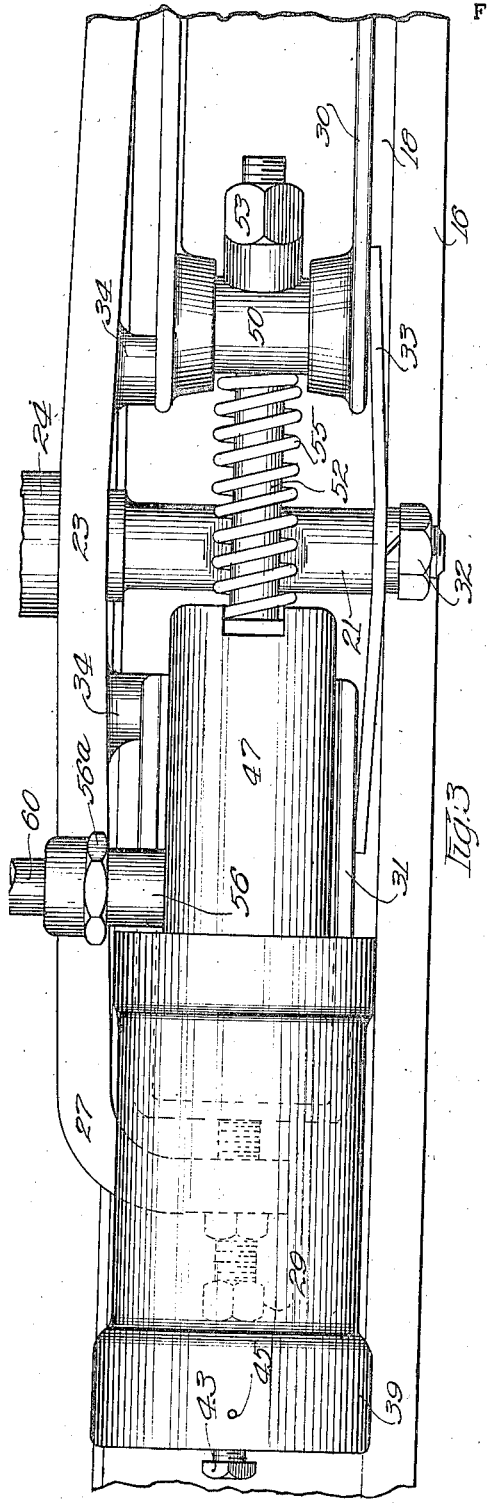
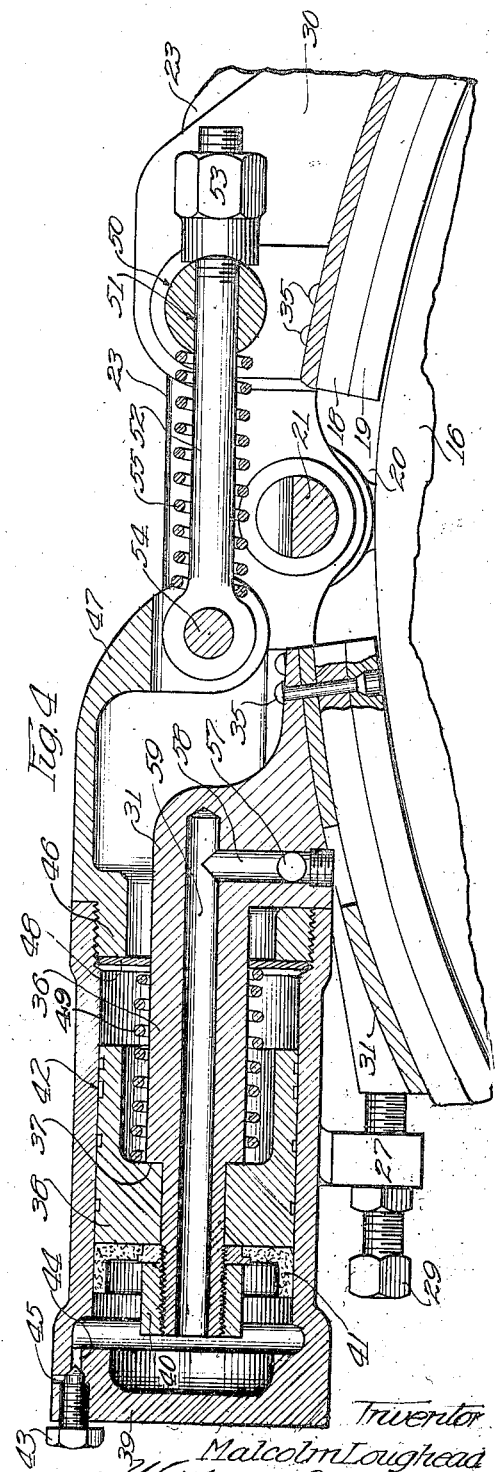
Inventor
Malcolm Loughead
Williams, Bradbury,
Guy & McCabe Attys.

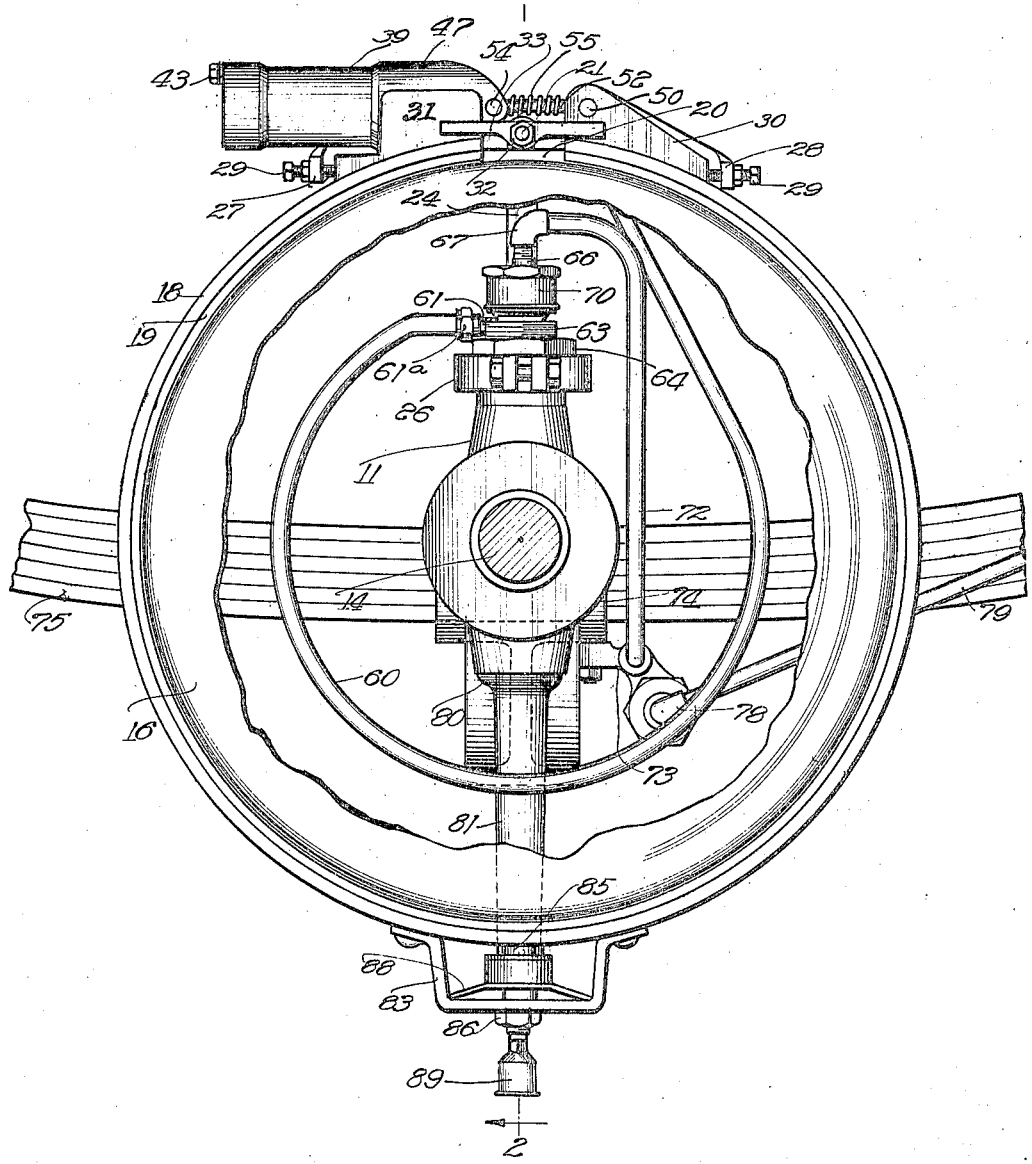

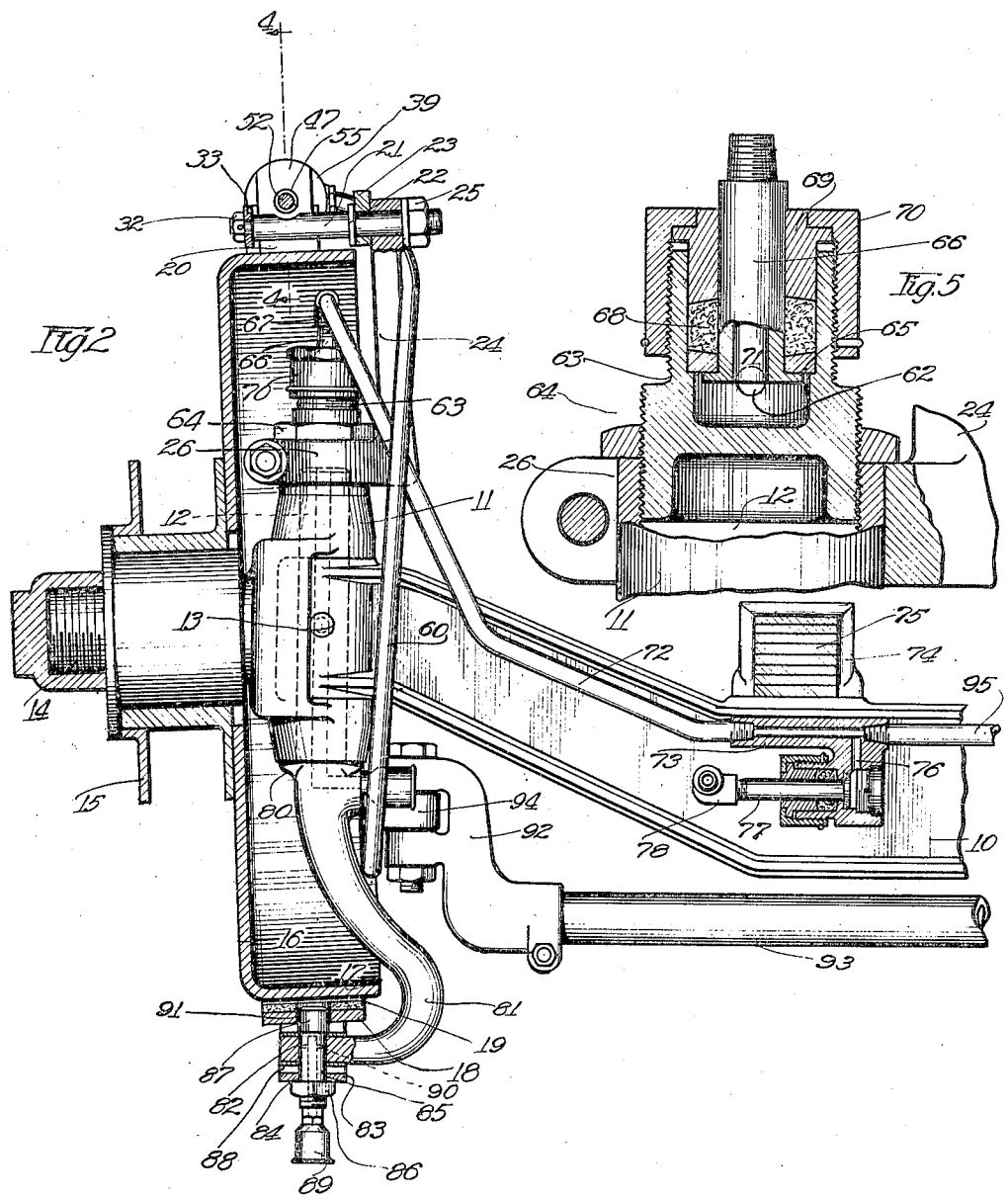

Patented June 26, 1923.

1,460,163

UNITED STATES PATENT OFFICE.

MALCOLM LOUGHEAD, OF DETROIT, MICHIGAN, ASSIGNOR TO FOUR WHEEL HYDRAULIC BRAKE COMPANY, OF LOS ANGELES, CALIFORNIA, A CORPORATION OF CALIFORNIA.

BRAKING APPARATUS.

Application filed December 17, 1920. Serial No. 431,332.

*To all whom it may concern:*

Be it known that I, MALCOLM LOUGHEAD, a citizen of the United States, and resident of Detroit, in the county of Wayne and State of Michigan, have invented a certain new and useful Improvement in Braking Apparatus, of which the following is a full, clear, concise, and exact description, reference being had to the accompanying drawings, forming a part of this specification.

My invention relates to braking apparatus of the fluid-operated type, and is concerned particularly with improvements in apparatus of this character described and claimed in my Patents, No. 1,249,143, issued December 4, 1917 and No. 1,288,944, issued December 24, 1918.

One of the objects of the present invention is to provide brake-operating apparatus which is mounted upon and movable as a whole with the steering knuckles of the steering wheels of an automobile.

Another object of this invention is to provide novel means for preventing lateral displacement of the brake band and its appurtenant operating mechanism from the periphery of the brake drum, and for preventing rotation of the brake band with the brake drum when the brakes are applied to stop the vehicle.

A further object of the invention resides in the provision of a number of swivel connections in the fluid pressure system between the movably mounted brake-operating mechanism, and the relatively stationary axle bar, and between certain parts of the operating mechanism to permit movement of one part relative to the other when the vehicle is traveling over the road and when the braking mechanism is in operation. By this method of coupling, I am enabled to use resilient metal tubing, instead of rubber or other flexible conduit, thereby eliminating objectionable expansion and contraction in the size of the fluid passage.

The foregoing and other objects of my present invention will be apparent from a consideration of the following detailed description, in which reference is made to the accompanying drawings, wherein—

Figure 1 is an isolated elevation looking at the outside of a brake drum, the central portion of which is broken away to disclose the steering knuckle upon which is supported the braking apparatus of my invention.

Figure 2 is a view from the right of Figure 1, with the brake drum and attached parts broken away on line 2—2 of Figure 1.

Figure 3 is an isolated plan detail, looking down upon the brake-operating mechanism.

Figure 4 is a longitudinal vertical section of the brake-operating mechanism taken on lines 4—4 of Figures 2 and 3, looking in the directions indicated by the arrows, and Figure 5 is an isolated enlarged vertical sectional detail of the upper end of a steering knuckle, illustrating the manner of mounting the braking mechanism thereupon and illustrating further the swivel connection provided at this point for permitting the knuckle to swing about on the end of the axle bar during operation.

The same reference numerals designate the same parts throughout the views.

Referring to the drawings and for the present particularly to Figures 1 and 2, a front axle bar 10 which has the usual offset ends is pivotally connected to the steering knuckles, one of which is shown at 11, by means of a pivot pin 12 held in place by a tapered pin 13. A steering axle 14 on the knuckle 11 carries a wheel 15, only the hub portion of which is shown. A brake drum 16, having a flange 17 is secured in the usual manner to the wheel 15. Surrounding the periphery of the drum 16 is a brake band 18 provided with the usual lining 19. The free ends of the brake band lie apart to provide a gap 20, directly over the knuckle 11, as most clearly seen in Figure 1.

Projecting laterally across the gap 20, parallel to the periphery of the brake drum is a rod 21, which is provided with a shoulder at 22, and passes through a yoke 23 and the upper end of a supporting arm 24 to receive a nut 25 for rigidly holding the parts together. The arm 24 extends downwardly and is provided at its lower end with a clamping collar 26 for securing the same upon the upper end of the steering knuckle 11 as most clearly shown in Figure 2. The yoke 23 extends at right angles to the rod 21 and the arm 24, and is bent outwardly at its free ends as illustrated at 27 and 28 to receive adjusting screws 29—29. The screws 29 bear against the outer ends of the brake band clip 30 and the piston supporting bracket 31 respectively.

Mounted upon the reduced outer end of the rod 21 and secured thereon by a nut 32 is a retainer bar 33 which extends horizontally at right angles to the rod 21 and, as most clearly shown in Figure 3, engages at its opposite ends one side of the bracket 31 and the clip 30. Provided on the inner side of the yoke 23 are the two bosses 34—34, which engage the adjacent side of the clip 30 and the bracket 31. The clip 30 and the bracket 31 are thus secured against lateral movement with the brake band on the periphery of the brake drum 16. It will further appear that the screws 29 are adjustable for taking up slack in the brake band 18, and for compensating for wear of the lining 19. The clip 30 and the bracket 31 are secured to the opposite ends of the brake band 18 by means of the rivets 35, as illustrated in Figures 3 and 4.

Referring now particularly to Figures 3 and 4 it will appear that the piston supporting bracket 31 comprises the base portion which is curved, as shown, to conform to the periphery of the brake band 18, and comprises also a barrel 36, extending horizontally forwardly. The outer end of the barrel 36 is reduced as at 37 and extends through the head of the piston 38 which is movable in a ram-cylinder 39. A nut 40 threaded upon the inner free end of the barrel 36 secures the piston 38 and a cup leather 41 to the inner end of the barrel 36. The cup leather 41 faces inwardly and lies flush with the head of the piston 38 and serves to prevent passage of fluid under pressure past the packing rings 42—42 to the other side of the piston. An air vent valve 43 located in the head of the cylinder 39 is arranged to restrict the passage of air or other fluid from the inside to the outside of the cylinder through the communicating ducts 44 and 45, for the purpose which will presently appear. The open end of the cylinder 39 is internally threaded, as shown, to receive the externally threaded portion 46 of the cup-shaped cylinder extension 47. A washer 48 through which the barrel 36 passes rests upon the inner end 46 of the extension 47 and serves as an abutment for a compression spring 49, which encircles the barrel 36 and lies between the washer 48 and the head of the piston 38 to assist the return of the piston after the brakes are no longer applied. The member 47 serves to protect the barrel portion 36 from injury and from dirt; the washer 48 acting as a partial seal for the open end of the cylinder 39 to prevent dirt or water from entering the same.

Pivotally mounted in the clip 30 is a pin 50 which extends transversely of the clip, parallel to the rod 21, and is transversely bored, as at 51, to receive a tie bolt 52 which is adjustable lengthwise by means of a nut 53, the engaging face of which is grooved as shown to prevent loosening thereof after adjustment, due to vibration. The opposite end of the bolt 52 is enlarged and provided with an eye, and is pivotally secured to the extension 47 by means of a pin 54 passing through the eye. A compression spring 55 encircling the bolt 52 is arranged to keep the pin 50 and the pin 54 properly spaced after the nut 53 has been adjusted.

Extending laterally from the inner side of the piston supporting bracket 31 is an externally threaded stem 56 provided with a duct 57 extending from the barrel 36. The duct 57 communicates with the ducts 58 and 59, which lead to the space in the cylinder 39 in front of the piston 38. Coupled to the end of the stem 56 by means of a union 56ª is a loop of resilient metal tubing 60, passing beneath the steering knuckle 11, as shown, and extending upwardly to the upper end of the steering knuckle where it is coupled to another externally threaded stem 61, by means of a similar union 61ª. The stem 61 is provided with a duct 62, communicating with the bore of a nipple 63, the lower enlarged end of which is threaded into the upper end of the steering knuckle 11, as shown in Figure 5. A lock nut 64 may be provided for securing the nipple 63. A shoulder is provided intermediate the ends of the bore of nipple 63 and is engaged by a ring 65 surrounding the inner flanged end of a swivel tube 66 which is threaded at its outer end and receives an elbow 67. Packing material 68 surrounding the tube 66 in the bore of the nipple 63 prevents passage of fluid under pressure past the ring 65 and along the outer wall of the tube 66. A packing gland 69 adjustably secured by a nut 70 holds the packing 68 in place. The duct 62 communicates with the bore 71 of the tube 66, and with a metal tube 72 secured in the elbow 67. The tube 72 is threaded at its outer end and received in a fitting 73 secured upon a flange of the axle bar 10 by means of the U bolts 74 which, in turn, secure the laminated leaf spring 75 of the automobile to the axle bar. The fitting 73 is provided with communicating ducts 76 whereby the tube 72 communicates with a swivel tube 77 mounted in the fitting 73 and suitably packed as shown similarly to the tube 66. An elbow 78 is threaded upon the outer end of the swivel tube 77 to provide connection for the end of a metal tube 79 which communicates with the fluid pressure producing means, preferably through the medium of a swivel connection. It may be here stated that while I prefer to utilize fluid-pressure producing and regulating means, as described and claimed in my copending applications, Serial Nos. 431,333 and 431,334, filed of even date herewith, any other suitable means may be employed for this purpose. Furthermore, although I prefer to use a non-compressible liquid for transmitting the pressure produced, other fluids, as for example, air, may, of course, be utilized, if desired.

As most clearly shown in Figure 2, the pivot pin 12 is provided with a shoulder at 80 for engaging the lower end of the steering knuckle 11, and is further provided beneath the shoulder 80 with a depending torque-arm 81 which extends inwardly to avoid the edge of the brake drum flange 17, and then extends outwardly as shown, and is provided with an opening 82 near its free end. The opening 82 is coaxial with the steering knuckle 11, as most clearly shown in Figure 2. A substantially U-shaped bracket 83 is riveted to the brake band 18 as illustrated, and is provided with an opening 84 coaxial with the opening 82. A stop pin 85 passes through the openings 82 and 84 and receives a nut 86. The upper end of the pin 85 is enlarged as at 87 to provide a shoulder which is urged into engagement with the torque arm at the opening 82 when the nut 86 is secured. A bent leaf spring 88 serves to hold the stop pin 85 in its adjusted position. The pin 85 is centrally bored and receives at its lower end a grease cup 89, for supplying grease thereto. Holes 90 are provided communicating with the bore of the pin 85 to permit the passage of grease to the outside of the pin 85, to lubricate the engaging surfaces. The enlarged end 87 of the stop pin 85 projects into an opening 91, provided therefore in the band 18.

As shown in Figure 2, the depending arm 81 clears a yoke member 92 which is suitably secured on the end of the tie rod 93. The yoke 92 is connected to the end of the steering arm 94 by means of which lateral movement communicated to the tie rod 93 by the steering gear causes the steering knuckle 11 to swing around on the axle bar 10 in the usual manner. The tie rod 93 connects, of course, with a similar yoke on the steering wheel on the opposite side of the vehicle, and it will be noted that a tube 95 similar to the tube 72 extends across the back of the axle bar 10 to establish communication with the brake operating mechanism on the wheel opposite the wheel 15 which mechanism may, of course, be a counterpart of that illustrated in connection with the wheel 15.

While I have not described the details of the mechanism used in connection with the rear wheels of the automobile, it will be understood that this mechanism may be generally similar to that illustrated with the exception that in connection with these wheels it will not be necessary to provide the same means or character of means of attachment as that illustrated, because the rear wheels are not subject to the same conditions of operation.

After the braking mechanism has been assembled upon the steering knuckle, I have found it a very practicable procedure in filling the system with the non-compressible fluid, to provide the air vent valves 43 which may be opened slightly to permit escape of air displaced by the fluid which is introduced preferably under a light pressure into the system at the pressure producing means or at any other convenient point. When the system has been completely filled, which is evidenced when no air bubbles are observed to escape, with the escaping fluid, at the valves 43, these valves may be closed and no more fluid supplied, whereupon the apparatus is ready for operation.

When pressure has been applied to the operating fluid in the system by the means provided, it is communicated through the tube 79 to the fitting 73 where it is communicated to both wheels by the tubes 72 and 95. The pressure in tube 72 is communicated through swivel tube 66, tube 60, duct 67 of the barrel 31, and ducts 58 and 59 to the cylinder 39 in front of the cupleather 41 and piston 38. The pressure which then obtains in the cylinder causes a repelling action between the piston 38 and the head of the cylinder 39. The force exerted on the piston 38 is communicated through the bracket 31 to the one end of the brake band 18, whereby the band is urged in the direction of the rod 21 so that the lining 19 engages the periphery of the brake drum flange 17. In a like manner, the force exerted on the cylinder head is communicated through the extension 47 and tie bolt 52 to the clip 30 which, being secured to the other end of the band 18, urges that end of the band also in the direction of the rod 21, so that the lining 19 is caused to firmly engage the periphery of the brake drum flange 17. This movement of the clip 30 and the piston supporting bracket 31 toward each other necessitates a flexible connection between the cylinder and the swivel connection mounted upon the upper end of the steering knuckle 11. The loop provided in the semi-rigid tube 60 compensates for this relative movement. Furthermore, should it be necessary to steer the vehicle out of its former course, the connection between the fitting 73 on the axle bar and the connection on the upper end of the steering knuckle 11, must bear the same proper relation as before. The swivel connection illustrated in Figure 5, and described above is, therefore, provided. The swivel connection of the tube 77 with the fitting 73 is provided to compensate for the relative movement of the axle bar with respect to the chassis, or to compensate for varying loads placed upon the chassis.

After the vehicle has been brought to a stop, or when it is no longer necessary to impede movement of the vehicle, the pressure on the fluid is relieved, whereupon the spring 49 urges the piston 38 and the cylinder 39 into their respective normal, inoperative positions, as illustrated in Figure 4. When these parts have assumed this position, the outer ends of the clip 30 and the bracket 31 engage the adjusting screws 29 as illustrated.

The stop pin 85, due to its rigid connection with the stationary pivot pin 12 prevents rotation of the brake band 18 with the brake drum 16, during the braking operation, and further insures that the clip 30 and the bracket 31 will assume their normal inoperative positions when the brakes are no longer applied. It will be apparent, because the pin 85 lies on the same axis with the steering knuckle 11, that unhindered pivotal movement of the steering knuckle 11 upon the outer end of the axle bar 10 is permitted.

In the foregoing description, I have made use of such terms are "forwardly" and "rearwardly", "inner" and "outer", "upwardly" and "downwardly", etc., which it must be understood are used merely in their relative sense and not in their specific sense.

While I have described the details of the preferred embodiment of my invention, I do not limit myself to these specific details, but claim further any adaptations of modifications coming within the spirit and scope of the appended claims.

What I claim is:—

1. In a braking apparatus, a steering wheel, a brake drum on said wheel, a brake band provided with a gap between its ends, means for causing engagement of said band with said drum, a steering knuckle for said wheel, a supporting arm mounted on and movable with said knuckle, a yoke on said arm for engaging one side of said band, means for guiding the movement of the ends of said band toward each other and for preventing lateral displacement from said drum, said means comprising a rod secured to said supporting arm and extending laterally across the gap in said band, and means for preventing rotary movement of said band with said drum and for preventing lateral displacement thereof from said drum at its lower portion, comprising a torque arm depending from the pivot pin in said steering knuckle, and rigidly secured thereto, a stop pin secured in the end of said arm co-axial with said pivot pin, and an opening in said band in which said stop pin is positioned.

2. In a brake operating mechanism, a steering wheel, a brake drum for said wheel, a brake band for said drum, and means for causing engagement of said band with said drum, comprising a clip secured to one end of said band, a cylinder secured thereto, a bracket secured to the other end of said band, and a piston mounted thereon and movable in said cylinder, a steering knuckle for said wheel, supporting arm mounted thereon and movable therewith, a yoke on said arm extending on one side of said band, means on said yoke for adjusting the slack in said band, comprising a pair of set screws for engaging the opposite ends of said bracket and clip, and means for guiding the movement of said bracket and clip toward each other, and for preventing lateral displacement thereof from said drum, comprising a rod secured to said supporting arm, a bar secured to said rod for engaging the sides of said bracket and clip opposite said yoke, and a pair of bosses on said yoke for engaging the adjacent sides of said bracket and clip.

3. In a fluid operated braking apparatus a steering wheel, a brake drum thereon, a brake band, means for causing engagement of said band with said drum, comprising a cylinder secured to one end of said band, a bracket secured to the other end of said band, and a piston mounted thereon and movable in said cylinder, a steering knuckle for said wheel, a supporting arm mounted on and movable with said knuckle, a yoke on said arm extending on one side of said band, and means for guiding the movement of said cylinder and piston with the opposite ends of said band, and means for preventing lateral displacement of said band from said drum at a point remote from said cylinder, and in alignment with the axis of said steering knuckle.

4. In a braking apparatus, a steering wheel, a brake drum thereon, a brake band, means for causing engagement of said band with said drum, comprising a cylinder connected to one end of said band, a piston connected to the opposite end of said band and movable in said cylinder, a steering knuckle for said said wheel, a supporting arm mounted thereon, and movable therewith, a yoke on said arm, means on said yoke for adjusting the slack in said band, means for guiding the movement of said cylinder and piston with the ends of said band, and for preventing lateral displacement thereof from said drum, and means for preventing rotary movement of said band with said drum, and for preventing lateral displacement thereof from said drum at a point remote from said cylinder, and in alignment with the axis of said steering knuckle.

5. In a fluid-operated braking apparatus, a steering wheel, a brake drum on said wheel, a brake band for engaging said drum, means for causing engagement of said band with said drum, a steering knuckle for said wheel, a supporting arm mounted thereon and movable therewith a yoke on said arm, means carried by said yoke at one side of said band for adjusting the slack thereof, means on the other side of said band for guiding the movement of the ends of said band and for preventing lateral displacement thereof from said drum, and means for preventing rotary movement of said band and for preventing lateral displacement thereof from said drum adjacent its lower portion.

6. In a braking apparatus, a steering wheel of an automobile, a brake drum on said wheel, a brake band, means for causing engagement of said band with said drum, a supporting arm mounted on said knuckle and movable therewith, a yoke on said arm extending on one side of said band, means on said yoke for adjusting the slack in said band, and means for guiding the movement of said band operating means with the ends of said band, and for preventing lateral displacement thereof on said drum.

7. In a braking apparatus, a steering wheel of an automobile, a brake drum thereon, a brake band provided with a gap between its ends, means for causing engagement of said band with said drum, a steering knuckle for said wheel, an arm mounted on said knuckle and movable therewith, a yoke on said arm extending on one side of said band, means on said yoke for adjusting the slack in said band, and means for guiding the movement of said band operating means with the ends of said band comprising a rod secured to said arm extending laterally across the gap in said band, a bar secured to said rod for engaging the side of said band operating means opposite said yoke, and a pair of bosses on said yoke for engaging the adjacent side of said band operating means.

8. In a braking apparatus, a steering wheel of an automobile, a brake drum thereon, a brake band, means for causing engagement of said band with said drum, a steering knuckle for said wheel, an arm mounted on and movable with said knuckle, and means for preventing lateral displacement of said band operating means, and said band, comprising a rod secured to said supporting arm and extending laterally across said band, a bar secured to said rod for engaging the side of said band operating means opposite said yoke, and a pair of bosses on said yoke for engaging the adjacent side thereof.

9. In a fluid operated braking mechanism, a steering wheel of an automobile, a brake drum thereon, a brake band, means for causing engagement of said band with said drum comprising a cylinder secured to one end of said band, and a piston mounted on the other end thereof and movable in said cylinder, a steering knuckle for said wheel, an arm mounted on and movable with said knuckle, a yoke on said arm, means on said yoke for adjusting the slack in said band, comprising a pair of set screws for engaging abutments adjacent the opposite ends of said band to limit the outward movement thereof, and means for guiding the movement of said band operating means comprising a rod secured to said arm, a bar secured to said rod for engaging the side of said band operating means opposite said yoke, and a pair of bosses on said yoke for engaging the adjacent side thereof.

10. In a braking apparatus, a steering wheel, a brake drum thereon, a brake band, means for causing engagement of said band with said drum, comprising a cylinder secured to one end of said band, and a piston mounted on the other end of said band and movable in said cylinder, a steering knuckle for said wheel, a supporting arm mounted on and movable therewith, a yoke on said arm, means carried by said yoke for adjusting the slack in said band, and means carried by said arm for preventing lateral displacement of said band from said drum.

11. In a braking apparatus, a steering wheel, a brake drum thereon, a brake band, means for operating said band to cause it to engage said drum, a steering knuckle for said wheel, a supporting arm mounted thereon, a yoke, means on said yoke for adjusting the slack in said band, comprising means for engaging the opposite ends of said band to limit their outward movement, and means carried by said arm for guiding the movement of said band operating means with the ends of said band, and for preventing lateral displacement thereof from said drum.

12. In a braking apparatus, a steering wheel, a brake drum thereon, a brake band, means for causing engagement of said band with said drum, comprising a cylinder secured to one end of said band, a piston secured to the other end of said band, and movable in said cylinder, a steering knuckle for said wheel, a fluid pressure producing means, a fitting on the axle of said wheel having communication with said pressure producing means, a swivel connection on said steering knuckle, a relatively rigid tube joining said fitting with said connection, said connection being adapted to swivel to compensate for oscillating movement of said knuckle, and a loop of resilient tubing joining said swivel connection with said band operating means.

13. In a fluid operated braking apparatus comprising a brake band for engaging the brake drum of a vehicle wheel, a clip secured upon one end of said band, and a bracket secured upon the other end thereof, said bracket having an integral barrel portion, a piston mounted on said barrel portion, a ram cylinder, said piston being movable in said cylinder, and a cup-shaped extention pivotally connected to said clip, and having screw threaded connection with the open end of said cylinder, said extension being arranged to cover the barrel portion of said bracket to protect the same from dirt and injury.

14. In a braking apparatus of the character described, comprising a brake band for engaging the periphery of the flange of the brake drum of the vehicle wheel, a clip secured upon one end of said band, and a bracket secured upon the opposite end thereof, a barrel portion on said bracket, a piston mounted on said barrel portion, a cylinder, said piston being movable in said cylinder, and a cup extension connected to said clip and secured in the open end of said cylinder to cover the barrel portion of said bracket to protect the same from dirt and injury.

15. In a braking apparatus, a vehicle wheel, a brake drum thereon, a brake band for engaging said drum, a clip secured upon one end of said band, and a bracket secured upon the opposite end thereof, a barrel portion on said bracket, a piston mounted on said barrel portion, a cylinder, said piston being movable in said cylinder, a cup extension connected to said clip and secured in the open end of said cylinder to cover the barrel portion of said bracket to protect the same from dirt and injury, a compression spring in said cylinder surrounding said barrel portion of said bracket and arranged to urge said piston to its normal, inoperative position, and means to serve as an abutment for said spring and to partially seal the open end of said cylinder against water and dirt, comprising a washer loosely surrounding said barrel portion of said bracket and engaging the inner end of said cup shaped extension.

16. In a braking apparatus of the character described, comprising a brake band for engaging the periphery of the flange of the brake drum of a vehicle wheel, a clip secured upon one end of said band, and a bracket secured upon the opposite end thereof, a barrel portion on said bracket, a piston mounted on said barrel portion, a cylinder, said piston being movable in said cylinder, a cup extension connected to said clip and secured in the open end of said cylinder to cover the barrel portion of said bracket to protect the same from dirt and injury, a spring in said cylinder for urging said piston toward the closed end of said cylinder, and means for partially sealing the open end of said cylinder and to act as an abutment for said spring, comprising a washer engaging said cup shaped extension.

17. In a brake mechanism, a brake drum, a brake band, and a fluid operated means for causing engagement of said band with said drum, said means comprising a cylinder, a link connecting said cylinder to one end of said band, and a piston rigidly secured to the opposite end of said band and positioned within said cylinder, said piston having an opening extending longitudinally thereof to permit the passage of fluid to said cylinder.

18. In a brake mechanism, a brake drum, a brake band, a cylinder, a link connecting said cylinder to one end of said band, a piston rigidly secured to the opposite end of said band and positioned within said cylinder, said piston having an opening extending longitudinally thereof to permit the passage of fluid under pressure to said cylinder.

19. In a braking apparatus, a steering wheel, a brake drum thereon, a brake band for engaging said drum, a steering knuckle for said wheel, and means for preventing rotary movement of said band with said drum and for preventing lateral displacement thereof from said drum at a point substantially in alignment with the axis of said steering knuckle, said means comprising a torque arm depending from the pivot pin of said steering knuckle, and rigidly secured thereto, a stop pin at the end of said arm co-axial with said pivot pin, and an opening in said band, and arranged to receive said stop pin.

20. In a braking apparatus, a steering knuckle, a steering wheel carried thereby, a brake drum on said wheel, a brake band, means for actuating said band to cause engagement of said band with said drum, and means for preventing rotary movement of said band with said drum, and for preventing lateral displacement thereof from said drum at a point remote from said actuating means, and in alignment with the axis of said steering knuckle.

21. In a braking apparatus, an axle bar, a steering knuckle carried thereby, a pivot pin for said steering knuckle, a steering wheel carried by said steering knuckle, a brake drum on said wheel, a brake band, means for actuating said band to cause engagement of said band with said drum, and means for preventing rotary movement of said band with said drum, and for preventing lateral displacement thereof from said drum at a point remote from said actuating means, said means for preventing rotation being carried by said pivot pin.

22. In a braking apparatus, an axle bar, a steering knuckle carried thereby, a pivot pin for said steering knuckle, a steering wheel carried by said steering knuckle, a brake drum on said wheel, a brake band, means for actuating said band to cause engagement of said band with said drum, and means for preventing rotary movement of said band with said drum, and for preventing lateral displacement thereof from said drum at a point remote from said actuating means, said means for preventing rotation being carried by said pivot pin, and in alignment with the axis of said steering knuckle.

23. In a braking apparatus, an axle bar, a steering knuckle carried thereby, a steering wheel carried by said steering knuckle, a brake drum on said wheel, a brake band, means for actuating said band to cause engagement of said band with said drum, and means for preventing rotary movement of said band with said drum, and for preventing lateral displacement thereof from said drum at a point remote from said actuating means, said means for preventing rotation being fixed to said axle bar.

24. In a braking apparatus, an axle bar, a steering knuckle carried thereby, a steering wheel carried by said steering knuckle, a brake drum on said wheel, a brake band, means for actuating said band to cause engagement of said band with said drum, and means for preventing rotary movement of said band with said drum, and for preventing lateral displacement thereof from said drum at a point remote from said actuating means, said means for preventing rotation being fixed to said axle bar, and in alignment with the axis of said steering knuckle.

In witness whereof, I hereunto subscribe my name this 13th day of December, 1920.

MALCOLM LOUGHEAD.

Witnesses:
I. O. BURTON,
H. MOFFET.